United States Patent
Jang

(10) Patent No.: US 6,857,219 B2
(45) Date of Patent: Feb. 22, 2005

(54) CASE STRUCTURE FOR HOUSING FISHING HOOK AND ITS FIXING METHOD

(76) Inventor: Hong Sun Jang, 103-1404 Daelim Apartment 501 Daebangdong, Dongsakku, Seoul (KR)

( * ) Notice: Subject to any disclaimer, the term of this patent is extended or adjusted under 35 U.S.C. 154(b) by 0 days.

(21) Appl. No.: 10/277,927

(22) Filed: Oct. 23, 2002

(65) Prior Publication Data

US 2003/0217501 A1 Nov. 27, 2003

(30) Foreign Application Priority Data

May 27, 2002 (KR) ................................ 10-2002-0029218

(51) Int. Cl.⁷ .............................................. A01K 97/06
(52) U.S. Cl. ......................................... 43/25.2; 43/57.1
(58) Field of Search ................ 43/25.2, 57.1, 43/52.2, 57.2

(56) References Cited

U.S. PATENT DOCUMENTS

| | | | | |
|---|---|---|---|---|
| 940,132 | A | * 11/1909 | Creasey | 43/57.1 |
| 1,269,743 | A | * 6/1918 | Richmond | 43/25.2 |
| 1,365,111 | A | * 1/1921 | Lawrence | 43/57.1 |
| 2,501,425 | A | * 3/1950 | Valentine | 43/57.1 |
| 2,703,467 | A | * 3/1955 | Shepherd | 43/57.1 |
| 2,767,502 | A | * 10/1956 | Reynolds | 43/25.2 |
| 2,829,461 | A | * 4/1958 | Tuttle | 43/25.2 |
| 2,849,825 | A | * 9/1958 | Reisner | 43/25.2 |
| 2,901,858 | A | * 9/1959 | Pinkerton et al. | 43/57.1 |
| 2,966,001 | A | * 12/1960 | Sader | 43/57.1 |
| 3,086,312 | A | * 4/1963 | Davis | 43/25.2 |
| 3,115,723 | A | * 12/1963 | Kline | 43/57.2 |
| 3,122,855 | A | * 3/1964 | Collier | 43/57.2 |
| 3,141,258 | A | * 7/1964 | Mayer | 43/57.2 |
| 3,180,053 | A | * 4/1965 | Norton et al. | 43/57.2 |
| 3,490,169 | A | * 1/1970 | Tweed | 43/57.1 |
| 3,800,456 | A | * 4/1974 | Rowe | 43/25.2 |
| 3,949,511 | A | * 4/1976 | Goldhaft | 43/57.1 |
| 3,988,850 | A | * 11/1976 | Steinman | 43/25.2 |
| 4,015,361 | A | * 4/1977 | O'Reilly et al. | 43/25.2 |
| 4,081,923 | A | * 4/1978 | Pruncutz | 43/57.1 |
| 4,383,385 | A | * 5/1983 | Myers | 43/57.1 |
| 4,452,003 | A | * 6/1984 | Deutsch et al. | 43/25.2 |
| 4,757,637 | A | * 7/1988 | Christensen | 43/57.1 |
| 4,796,380 | A | * 1/1989 | Beese | 43/57.1 |
| 4,884,357 | A | * 12/1989 | Clifford | 43/25.2 |
| 5,123,199 | A | * 6/1992 | Lysohir et al. | 43/57.1 |
| 5,233,783 | A | * 8/1993 | Roebuck et al. | 43/25.2 |
| 5,430,969 | A | * 7/1995 | Taylor et al. | 43/25.2 |

(List continued on next page.)

FOREIGN PATENT DOCUMENTS

| | | | |
|---|---|---|---|
| CA | 644346 B1 | * 7/1962 | ............ 43/57.1 |
| DE | 3527214 B1 | * 2/1986 | |
| FR | 2712776 B1 | * 6/1995 | |
| FR | 2813164 B1 | * 3/2002 | |
| GB | 2187721 B1 | * 9/1987 | |

(List continued on next page.)

*Primary Examiner*—Darren W. Ark
(74) *Attorney, Agent, or Firm*—Jean C. Edwards; Dickinson Wright PLLC

(57) ABSTRACT

Disclosed is a case structure for housing a fishing hook capable of holding a fishing hook in safe and being attached to a fishing rod case without movement. The case structure for housing the fishing hook includes: a case body having a fishing hook receiving part with a predetermined area for receiving and holding a fishing hook and a cover part coupled to the fishing hook receiving part to be opened and closed; and a projection formed on the fishing hook receiving part in such a manner as to be projected by a predetermined height from the top surface of the fishing hook receiving part for catching the fishing hook. The case body has an elastic fixing string mounted at one side of the case body and having a fixing ring, so that the fishing hook case can be attached to the fishing rod case without movement.

12 Claims, 6 Drawing Sheets

U.S. PATENT DOCUMENTS 5,475,942 A * 12/1995 Tatum .................... 43/25.5
5,542,206 A *  8/1996 Lisch .................... 43/54.1
5,625,977 A *  5/1997 Medford ................. 43/57.1
6,301,825 B1 * 10/2001 Doreian ................. 43/57.1
6,474,013 B2 * 11/2002 Terry ................... 43/57.1

FOREIGN PATENT DOCUMENTS

| | | | |
|---|---|---|---|
| GB | 2294188 B1 * | 4/1996 |
| JP | 8-143 B1 * | 1/1996 |
| JP | 8-70746 B1 * | 3/1996 |
| JP | 10-191859 B1 * | 7/1998 |
| JP | 10-229797 * | 9/1998 |
| JP | 11-169045 B1 * | 6/1999 |
| JP | 11-318301 B1 * | 11/1999 |
| JP | 2001-112393 B1 * | 4/2001 |
| JP | 2002-171885 B1 * | 6/2002 |
| JP | 2002-218886 B1 * | 8/2002 |
| WO | WO-89/11791 B1 * | 12/1989 |
| WO | WO-02/35926 B1 * | 5/2002 |

\* cited by examiner

CASE STRUCTURE FOR HOUSING FISHING HOOK AND ITS FIXING METHOD

BACKGROUND OF THE INVENTION

1. Field of the Invention

The present invention relates to a case structure for housing a fishing hook, and more particularly, to a case structure for housing a fishing hook which can keep a fishing hook safe by improving a fishing hook fishing hook receiving part and a hook structure.

2. Background of the Related Art

In general, fishing is to catch fishes by enticing fishes using baits put on a fishing hook. The fishing is largely divided into two: one being sea fishing for catching fishes in the sea; and the other being river fishing for catching fresh fishes in a river. Additionally, the fishing is divided into two according to kinds of fishing rods: one being reel fishing having a reel for winding a fishing line to throw the fishing hook further away than the fishing rod, and the other being pole-and-line fishing for catching fishes by directly tying a line on the fishing rod without the reel. In the typical pole-and-line fishing, the fishing line is tied on the end portion of the fishing rod, which is made of carbon or glass rod material, and a sinker is hung up the end portion of the fishing line. The fishing hook is connected to the opposite side of the sinker through a leader. A float number passing the fishing line between the upper portion of the sinker and the end portion is mounted to fix a "Nallary" which made of flexible material in the form of line, and connected at one side to the intermediate body of a float and connected at the other end to the fishing line.

A state in which buoyancy of the float and weight of the sinker on which the fishing hook is hung are equal to each other is called zero float adjustment. In the zero float adjustment, if the fishing hook is thrown into water and a fish takes the baits of the fishing hook, the power balance between the float, which is in a weightless state, and the sinker is upset and a float top rises to the water surface. It is a float action by bite of the fish. If you see the live float action using a chemical light at night, you can feel it is fantastic. If a user lifts up or pulls the fishing rod, the fishing hook is caught to the mouth of the fish, and then, the fish is come out of the water.

If the fishing is finished, the fishing rod is folded and put into a fishing rod case typically made of synthetic vinyl or cloth. The fishing line connected to the upper portion of the end portion of the fishing rod is wound reciprocating between line hanger buttons located away from the fishing rod case.

After the fishing line is wound entirely, the fishing hook must be handled in safe. However, it is difficult to take out the fishing hook again after the fishing hook is put into the fishing rod case. Especially, in case of the fishing hook having barbs, it is very difficult to take out the fishing hook if the end portion of the hook is caught beyond the barb portion. If the fishing hook is put lightly to prevent the above problem, the fishing hook is come out while the user moves the fishing rod case to fish, and thereby, the user gets pricked with the fishing hook or the fishing hook is stuck in a nearby object.

In case of lure fishing, to keep the fishing hook safe demands careful attention because the fishing hook for lure fishing is provided with three barbs.

To solve the above problems, generally, a case structure for housing a fishing hook shown in FIG. 1 has been used. Referring to FIG. 1, the conventional case structure for housing the fishing hook will be described.

FIG. 1 is a perspective view of the conventional case structure for housing the fishing hook.

As shown in the drawing, a case body 10 has a fishing hook receiving part 12 for holding a fishing hook 30, a concave hole 14 formed in a side thereof for inserting a fishing line 32, and a coupling part 20 opened and shut. The coupling part 20 has a locking protrusion 22 and a locking hole 24, which are formed at surfaces separated or contacted when the case body 10 is opened or shut.

However, because the conventional case structure for housing the fishing hook is only to isolate the fishing hook 30 from the outside by holding it in the receiving part 12, the fishing hook 30 held in the receiving, part 12 cannot be kept in the optimum condition. That is, there is a disadvantage that the fishing hook 30 held in the receiving part 12 is moved in the receiving part 12. As the result, the fishing hook is collided with an inner wall of the case when being moved, and then, the end portion of the fishing hook becomes dull. Further, in case of lure fishing, the case cannot keep the fishing hook safe because the fishing hook for lure fishing is provided with three barbs. In consequence, there is required a new type of case.

SUMMARY OF THE INVENTION

Accordingly, the present invention is directed to a case structure for housing a fishing hook that substantially obviates one or more problems due to limitations and disadvantages of the related art.

An object of the present invention is to provide a case structure for keeping a fishing hook safe without movement.

Another object of the present invention is to provide a case structure for housing a fishing hook capable of preventing entanglement of a fishing line by firmly fixing the fishing hook case to a fishing rod case.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the case structure for housing the fishing hook according to a first embodiment includes: a case body having a fishing hook receiving part with a predetermined area for receiving and holding a fishing hook and a cover part coupled to the fishing hook receiving part to be opened and closed; and a projection formed on the fishing hook receiving part in such a manner as to be projected by a predetermined height from the top surface of the fishing hook receiving part for catching the fishing hook.

The case body has a ring formed at one side of the case body.

The ring has an elastic fixing string, and the elastic fixing string has a round fixing ring formed integrally at the end portion of the fixing string.

The projection is formed at one side of the case body or the cover part in a round form, and has a jaw formed on the upper end.

The case structure for housing the fishing hook further includes a pressing part formed on the surface of the case body corresponding to the projection, and the pressing part has a hole inserted into the projection.

The case body is in the form of a fish.

The case body has a locking part formed at one side thereof for locking the cover part to the case body.

The case body is coated with luminous material or fluorescent material.

A method for fixing the fishing hook case according to the first embodiment includes the steps of: putting the fishing hook, on which the fishing line is tied, inside the fishing hook case having the elastic fixing string; winding the fishing line on a line winding part mounted on a fishing rod case; and hanging and fixing the fixing string on a side of the line winding part.

In another aspect of the present invention, a case structure for housing a fishing hook according to a second embodiment includes: a case body having a cover part and a fishing hook receiving part, the fishing hook receiving part having inclined side walls of a predetermined depth for holding a fishing hook; and a pair of projections formed from the inclined side walls of the fishing hook receiving part to a predetermined height to hold the fishing hook.

The fishing hook receiving part has a groove deeply formed in a downward direction of the bottom surface of the fishing hook receiving part through the whole length of the case body.

The fishing hook receiving part holds the fishing hook having three barbs.

The case body has a ring formed at one side thereof.

The ring has an elastic fixing string, and the elastic fixing string has a round fixing ring formed integrally at an end of the fixing string.

The case body has a locking part formed at one side thereof for locking the cover part to the case body.

A method for fixing the fishing hook case according to the second embodiment includes the steps of: putting the fishing hook inside the fishing hook case having the elastic fixing string; winding the fixing string on the outer circumferential surface of the fishing rod; and hanging and fixing the fixing string on the fishing hook case.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
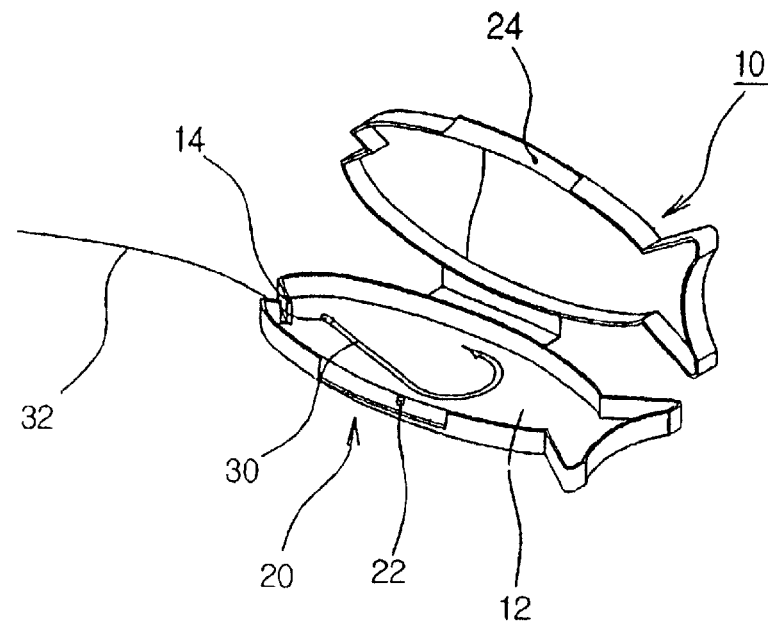
FIG. 1 is a perspective view of a conventional case structure for housing a fishing hook.
Figure 2:
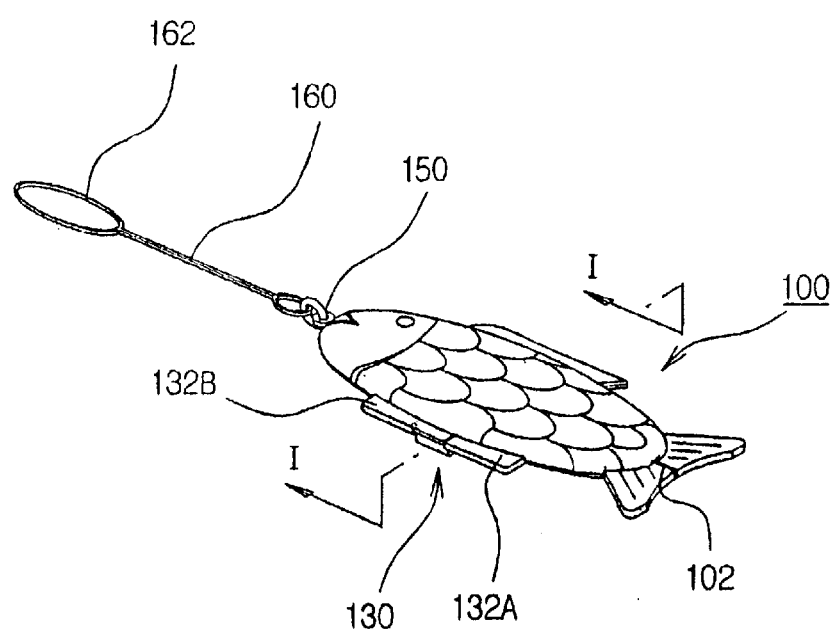
FIG. 2 is a perspective view of a case structure for housing a fishing hook according to a first preferred embodiment of the present invention.
Figure 3A:
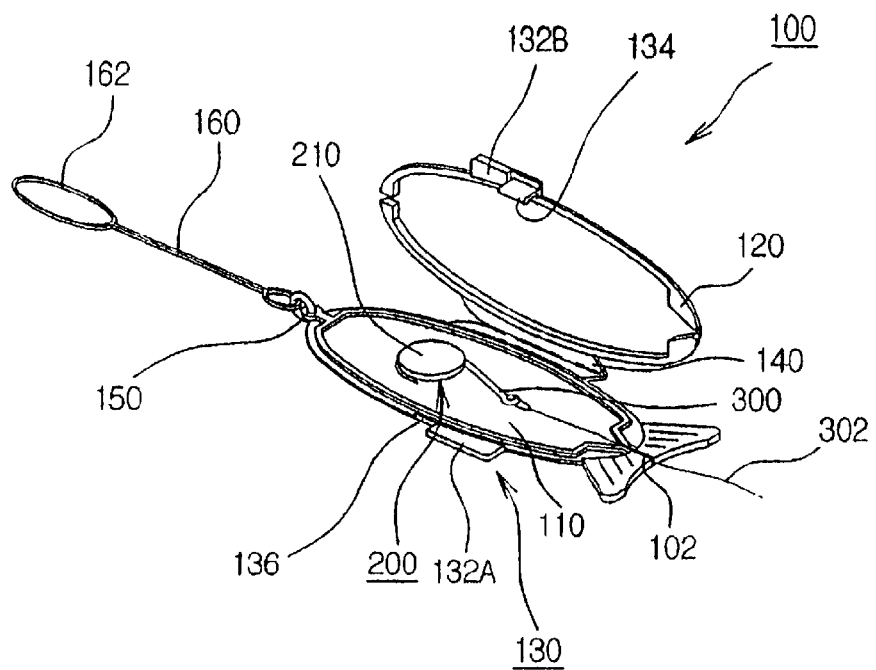
FIGS. 3a and 3b are perspective views, showing a state that a cover part is opened, for explaining a projection of the fishing hook case according to the first embodiment of the present invention.
Figure 3B:
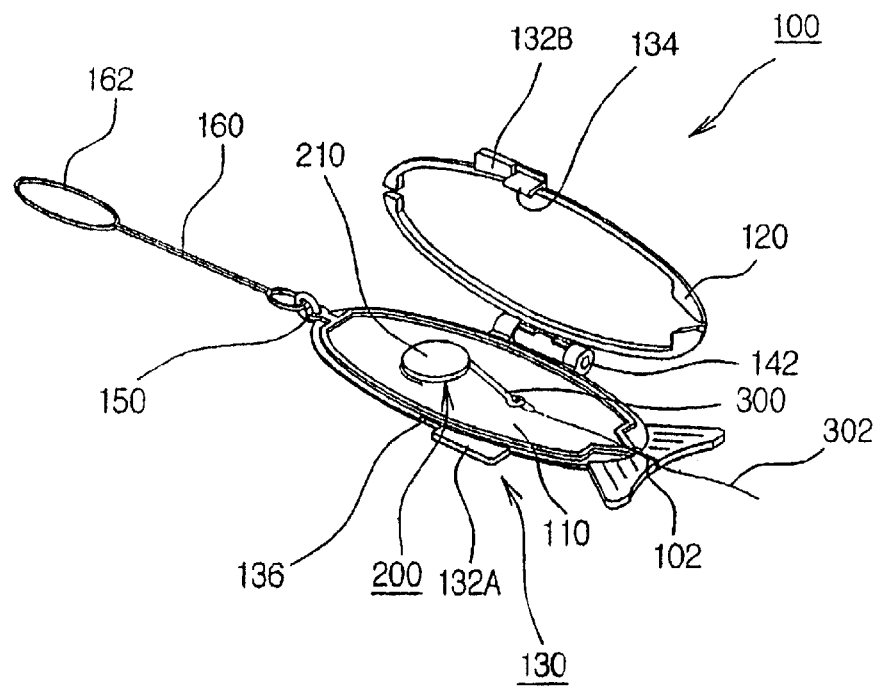
Figure 4:
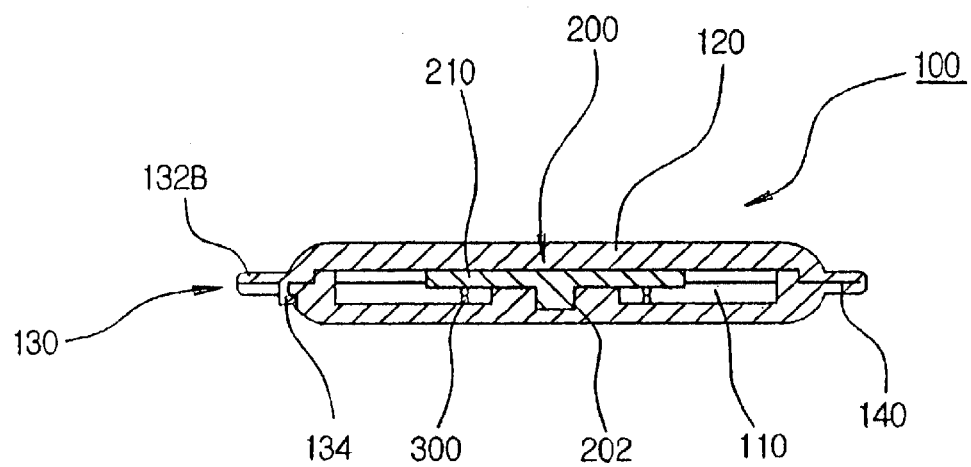
FIG. 4 is a sectional view taken along the line of I—I of FIG. 2.
Figure 5:
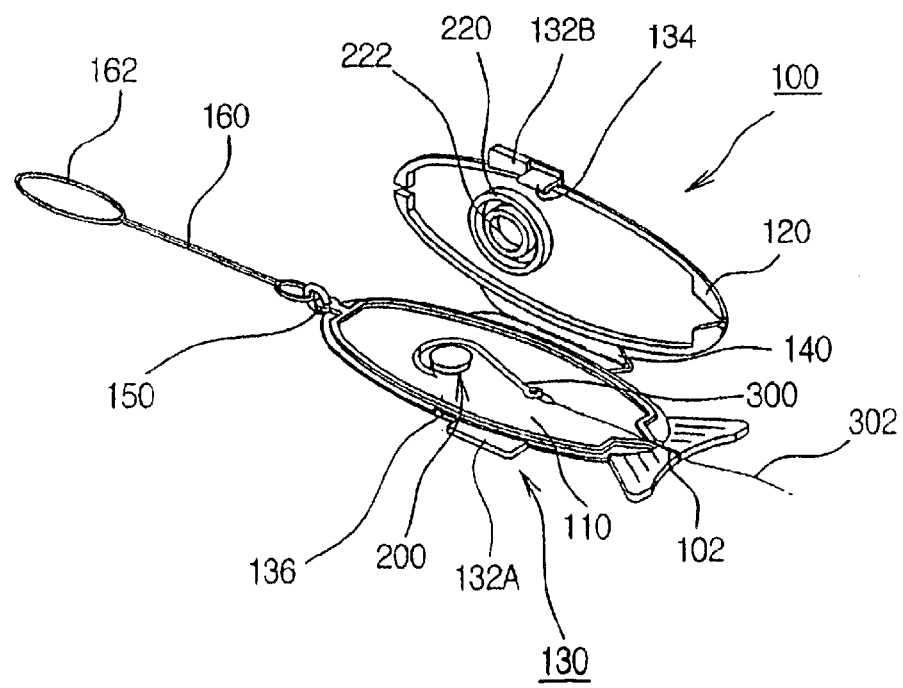
FIG. 5 is a perspective view, showing a state that the cover part is opened, for explaining another example of the projection of the fishing book case according to the first embodiment.
Figure 6A:
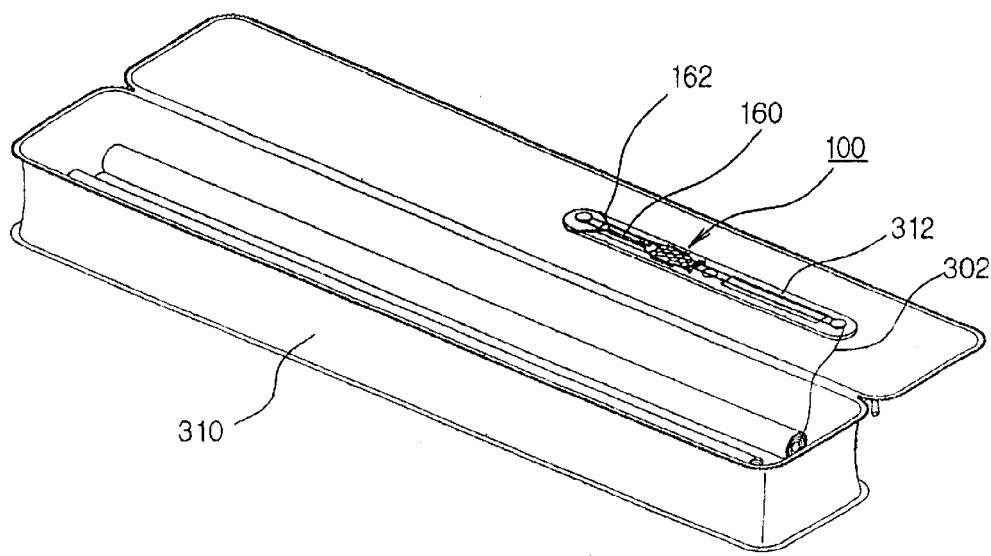
FIGS. 6a and 6b are perspective views showing a fixing method of the fishing hook case according to the first embodiment.
Figure 6B:
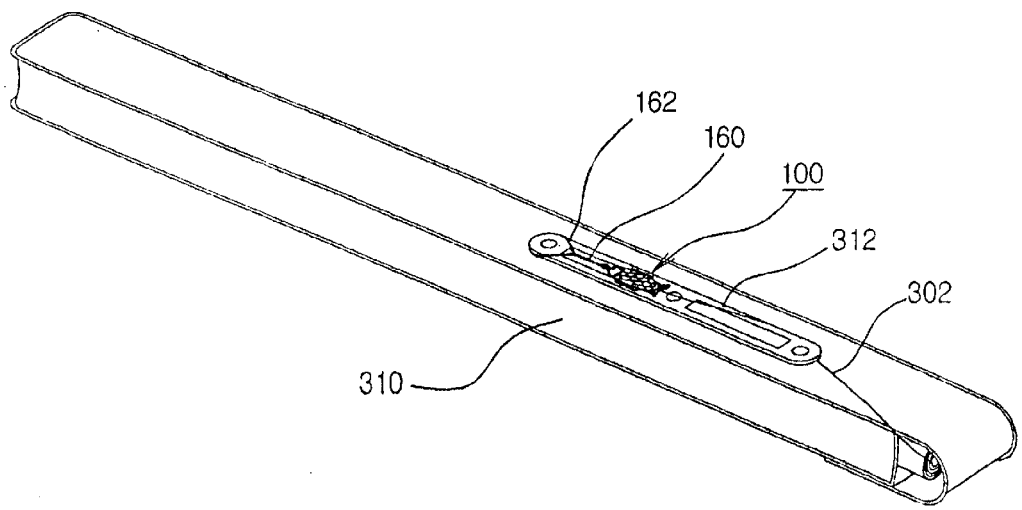

FIG. 2 is a perspective view of a case structure for housing a fishing hook according to a first preferred embodiment of the present invention. FIGS. 3a and 3b are perspective views, showing a state that a cover is opened, for explaining a projection of the fishing hook case according to the just embodiment of the present invention. FIG. 4 is a sectional view taken along the line of I—I of FIG. 2. FIG. 5 is a perspective view, showing a state that the cover is opened, for explaining another example of the projection of the fishing hook case according to the first embodiment. FIGS. 6a and 6b are perspective views showing a fixing method of the fishing hook case according to the first embodiment.

As shown in the drawings, in the first embodiment, the case structure for housing the fishing hook has a case body 100. The case body 100 is as large as a fishing hook 300 is received and kept therein. The case body 100 is not restricted in shape, but is preferable to be formed in a fish shape as shown in the drawings.

Furthermore, it is preferable that the case body 100 is coated with luminous or fluorescent material or mixture of the luminous and the fluorescent materials. It is to provide convenience in use to easily check the case body 100 in the night time or day time.

The case body 100 includes a fishing hook receiving part 110 of a predetermined size for holding the fishing hook 300 and a cover 120 for opening and shutting the fishing hook receiving part 110.

Preferably, the case body 100 has an opening 102 formed in a side thereof for passing a fishing line 302 tied to the fishing hook 300 held in the fishing hook receiving part 110. The hole 102 allows the fishing line 302 to be discharged to the outside, but it is not essential to form the opening 102. The reason is that the case body 100 and the cover 120 are locked compressing the fishing line 302 because the fishing line 302 is very thin.

The case body 100 and the cover 120 have a collapsible part 140 formed at one side thereof for opening and shutting the cover 120. Preferably, as shown in FIG. 3a, the collapsible part 140 is formed integrally with the case body 100 and the cover 120. However, if the case body 100 and the cover 120 are separated from each other as shown in FIG. 3b, they are coupled by a binge 142 in stead of the collapsible part 140 for opening and shutting the cover 120.

Moreover, the case body 100 has a locking pall 130 provided on an opposite side of the collapsible part 140 of the case body 100 and the cover 120 to lock the cover 120 to the case body 100. The locking part 130 includes a pair of opening and shutting sections 132A and 132B formed on the case body 100 and the cover 120 respectively to correspond to each other, and a locking protrusion 134 and a locking recess 136 respectively formed on the corresponding sides of the opening and shutting sections 132A and 132B. When the locking protrusion 134 is snap-fitted into the locking recess 136, the case body 100 and the cover 120 are locked to each other. Furthermore, the opening and shutting sections 132A and 132B make the opening and shutting of the case body 100 and the cover 120 convenient.

The case body 100 has a ring 150 formed at one side thereof, and an elastic fixing string 160 mounted on the ring 150. The fixing string 160 has a round fixing ring 162 formed integrally at the end of the fixing string 160. For example, the elastic fixing string 160 may be a rubber band made of rubber material.

As shown in the drawings, the case structure for housing the fishing hook according to the first embodiment has a projection 200. The projection 200 is to prevent a curved portion of the fishing hook 300 held inside the fishing hook receiving part 110 from being moved. The projection 200 is formed from the fishing hook receiving part 100 of the case body 100 to a predetermined height to hang the fishing hook 300 on the projection 200.

As shown in FIGS. 3a, 3b and 4, the projection 200 is formed on an inner surface of the case body 100 or the cover 1200 in a round form, and has a jaw 210 formed on the upper end. The jaw 210 serves to prevent movement or separation of the fishing hook 300, which is hung on the projection 200.

The jaw 210 is formed integrally with the projection 200, or as shown in FIG. 4, coupled integrally to a coupling hole 202, which is formed in the center of the projection 200. At this time, the jaw 210 is forcedly fit with the coupling hole 202 of the projection 200 to prevent separation, or integrated with the coupling hole 202 using an adhesive.

Alternatively, as shown in FIG. 5, the projection 200 is formed on the inner surface of the case body 100 or the cover 120 in the round form, and a pressing part 220 formed on the surface of the cover 120 or the case body 100, which corresponds to the projection 200. The pressing part 220 has a hole 222 into which the projection 200 is pressed. The fishing hook 300 hung on the projection 200 is pressed using a predetermined force by the pressing part 220, and thereby is prevented from the movement or separation.

According to the case structure for housing the fishing hook of the first embodiment, to keep the fishing hook, first, a user opens the cover 120 to open the fishing hook receiving part 110. In this condition, the curved portion of the fishing hook 300 is hung and fixed on the projection 200. At this time, one or more fishing hooks may be hung and fixed on the projection 200.

The fishing hook 300 hung on the projection 200 is prevented from the movement or separation by the jaw 210 formed on the upper end of the projection 200 and the pressing part 220.

Furthermore, after hanging the fishing hook 300 on the projection, the user arranges the fishing line 302, which is tied on the fishing hook 300, to be discharged to the outside through the opening 102 formed in the case body 100.

In this condition, if the user locks the cover 120 to the case body 100, the fishing hook 300 is fixed to the projection 200 of the fishing hook receiving part 110 and prevented from being damaged or becoming dull because the fishing hook 300 is not moved inside the fishing hook receiving part 110.

After holding the fishing hook 300 inside the fishing hook receiving part 110, the user winds the fishing line 302, which is discharged through the opening 102 of the case body 100, on a line winding part 312 disposed on the fishing rod case 310, and then, hangs the elastic fixing string 160 of the case body 100 on a side of the line winding part 312 of the fishing rod case 310. At this time, the elastic fixing string 160 is mounted finely and prevents the movement of the case body 100 because being hung on the line winding part 312 in an expanded state, as shown in FIGS. 6a and 6b.

FIG. 6a shows an example that the line winding part 312 is formed inside the fishing rod case 310, and FIG. 6b shows another example that the line winding part 312 is formed outside the fishing rod case 310. One of the two examples may be adopted in the present invention.

Figure 7:
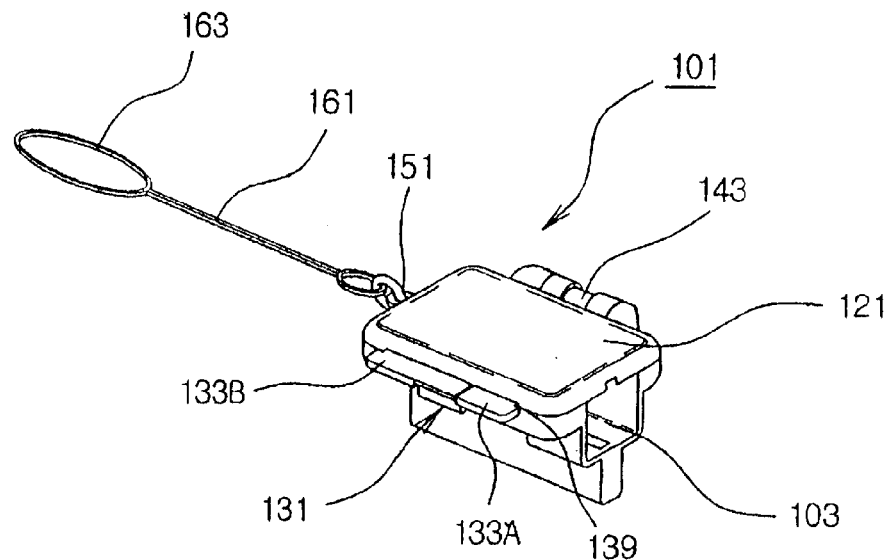
FIG. 7 is a perspective view of a case structure for housing a fishing hook according to a second preferred embodiment of the present invention.
Figure 8:
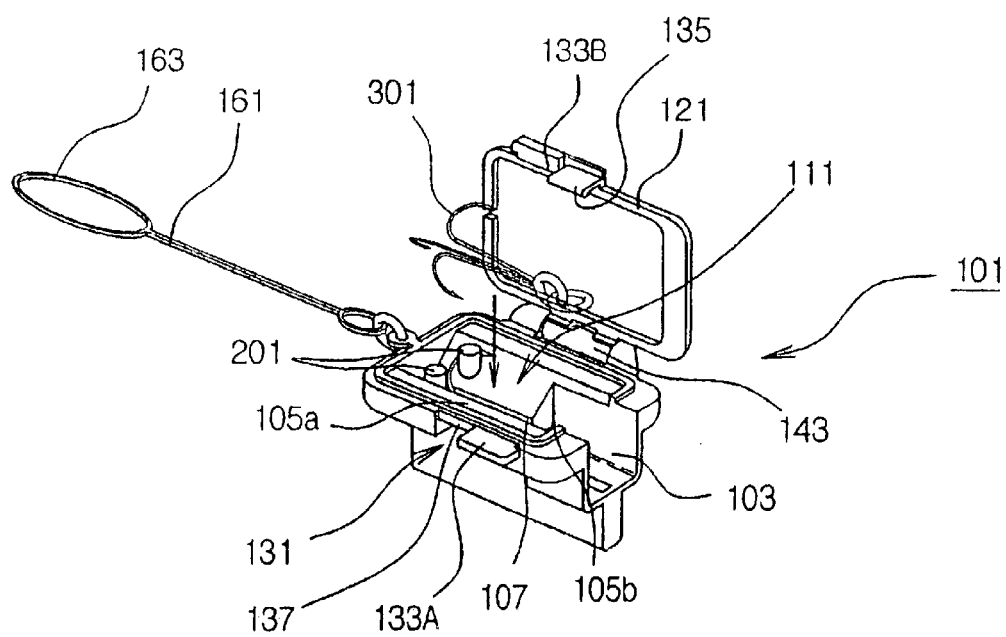
FIG. 8 is a perspective view showing a state that a cover part of the fishing hook case according to the second embodiment.
Figure 9:
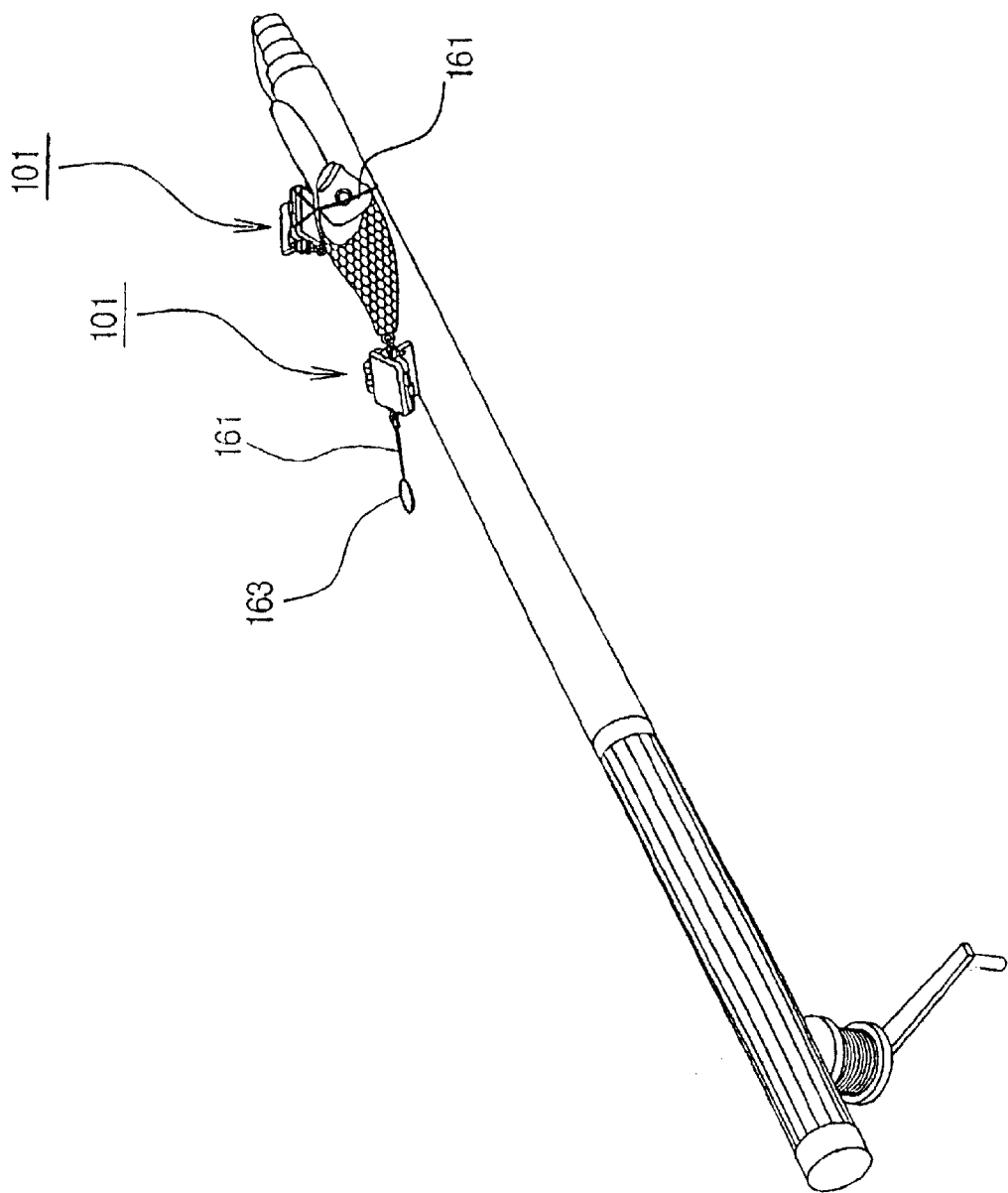
FIG. 9 is a perspective view showing an example of a fixing method of the fishing hook case according to the second embodiment.

FIG. 7 is a perspective view of a case structure for housing a fishing hook according to a second preferred embodiment of the present invention. FIG. 8 is a perspective view showing a state that the cover of the fishing hook case according to the second embodiment. FIG. 9 is a perspective view showing an example of a fixing method of the fishing hook case according to the second embodiment.

As shown in the drawings, the case structure for housing the fishing hook according to the second embodiment of the present invention has a case body 101. The case body 101 has a volume capable of holding a fishing hook 301 having three barbs formed integrally.

The case body 101 includes a fishing hook receiving part 111 formed inside the case body 101 for holding the fishing hook 301, and may have a cover 121 for opening and shutting the fishing hook receiving part 111. The fishing hook receiving part has a pair of side walls 105a and 105b inclined to a predetermined depth. It is important that the case body 101 holds the fishing hook 301 having three barbs formed integrally. Therefore, the fishing hook receiving part 111 has a groove 107 deeply formed in a downward direction of the bottom suit face of the fishing hook receiving part 111 through the whole length of the case body 101.

As in the first embodiment, the case body 101 has an opening 103 formed in a side thereof, a hinge 143 for coupling the case body 101 and the cover 121 to each other, and a locking part 131 formed on the opposite side of the hinge 143 for locking the cover 121 to the case body 101.

The locking part 131 includes a pair of opening and shutting sections 133A and 133B formed on the case body 101 and the cover 121 respectively to correspond to each other, and a locking protrusion 135 and a locking recess 137 respectively formed on the corresponding sides of the opening and shutting sections 133A and 133B. When the locking protrusion 135 is snap-fitted into the locking recess 137, the case body 101 and the cover 121 are locked to each other. Furthermore, the opening and shutting sections 133A and 133B make the opening and shutting of the case body 101 and the cover 121 convenient.

Holes 139 are formed at both sides of the opening and shutting sections 133A and 1331B to hold the fixing string 161, which will be described later. That is, as shown in FIG. 9, the fixing string 161 is wound around the fishing rod once, and then, held in the holes 139, and thereby, the case body 101 mounted on the fishing rod is prevented from the movement.

The case body has a ring 151 formed at one side thereof. The elastic fixing string 161 is mounted to the ring 151, and has a round fixing ring 163 formed integrally. For example, the elastic fixing string 161 is a rubber band made of rubber material.

As shown in FIG. 9, the case body 101 is fixed to the fishing rod by the fixing ring 161, or to the fishing rod case as in the first embodiment.

Also, in the second embodiment, the case body 101 may be coated with luminous or fluorescent material or mixture of the luminous and fluorescent materials.

As shown in the drawings, the case structure for housing the fishing hook according to the second embodiment of the present invention has a pair of projections 201. The projections 201 are to catch the barbs of the fishing hook 301 received inside the fishing hook receiving part 111. The projections are formed from the inclined walls 105a and 105b of the case body 101 to a predetermined height to hold the fishing hook 301 having the three barbs.

To keep the fishing hook in the case structure for housing the fishing hook according to the second embodiment of the present invention, first, the user opens the cover 121 to open the fishing hook receiving part 111. In this condition, the user puts the fishing hook 301 having the tree barbs into the fishing hook receiving part 111. At this time, one of the three barbs of the fishing hook is inserted into the hole 107 formed in the fishing hook receiving part 111, and the others are caught to the projections 201 formed in the fishing hook receiving part 111. After putting the fishing hook 301 inside the case body 101, the user locks the cover 121 to the case body 101 to hold the fishing hook 301 inside the fishing hook receiving part 111 of the case body 101.

After holding the fishing hook 301 inside the case body 101, the user winds the elastic fixing string 161, which is formed at the side of the case body 101, on the outer circumferential surface of the fishing rod as shown in FIG. 9. After that, the user fixes the fixing ring 163 of the fixing string 161 to the holes 139, which are formed in the opening and shutting sections of the case body 101. At this time, the fixing string 161 is wound on the outer circumferential surface of the fishing rod in an expanded state, thereby preventing the movement of the case body 101 and being fully attached to the fishing rod.

Additionally, the fixing string 161 may be fixed to the line winding part of the fishing rod case as in the first embodiment. The fixing string 161 may be fixed to the line winding part mounted inside the fishing rod case or the line winding part mounted outside the fishing rod case.

As described above, the present invention can keep the fishing hook stably without any movement and extend the lifetime of the fishing hook.

Moreover, the present invention can prevent entanglement of the fishing line because the fishing hook case is firmly fixed to the fishing rod case.

The forgoing embodiments are merely exemplary and are not to be constituted as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A case for housing a fishing hook, comprising:
   a body portion having first and second sections coupled to each other to be opened and closed;
   wherein said first and second sections form a hook receiving area when said first and second sections are in a closed position; and
   at least one projection extending a predetermined distance from an internal surface of said first section of said body portion for holding the fishing hook in said hook receiving area, said at least one protection comprising:
   an upwardly protruding seating portion having a coupling hole disposed therein, said coupling hole having an open end and a closed end, said seating portion having a bottom end extending across said coupling hole and defining said closed end of said coupling hole; and
   a base having a top portion at a top end, which is larger in diameter than a diameter of said base, said top portion having a flat upper surface;
   wherein said base is disposed in said coupling hole such that said base and said seating portion form an integral structure, said top portion of said base forms a jaw which overhangs said seating portion.

2. The case of claim 1, wherein said section has an internal surface with a pressing part thereon adapted to hold the fishing hook on said projection between said internal surface of said first section and said pressing part when said first and second sections are in said closed position.

3. The case of claim 1, wherein said case has a ring formed thereon, wherein the ring has a fixing string attached thereto with a fixing ring integrally formed thereon.

4. The case of claim 1, wherein said case is in a shape of a fish.

5. The case of claim 1, wherein said case has locking portions for locking said first and second sections together in said closed position.

6. The case of claim 1, wherein said case is coated with one of a luminous and a fluorescent material.

7. The case of claim 1, wherein an opening is formed between said first and second sections such that when said body portion is in said closed position, a string extending from the fishing hook can be extended through said opening.

8. A case structure for housing a fishing hook comprising:
   a case body having a fishing hook receiving part with a predetermined area for receiving and holding the fishing hook; and
   a cover coupled to the fishing hook receiving part to be opened and closed;
   wherein the case body has a ring formed at one end of said case body; and
   wherein the ring has an elastic fixing string attached thereto, the elastic fixing string having a round fixing ring formed integrally at and end portion of the fixing string;
   a projection formed on the fishing hook receiving part in such a manner as to be projected by a predetermined height from a top surface of the fishing hook receiving part for holding the fishing hook, said protection comprising:
   an upwardly protruding seating portion having a coupling hole disposed therein; and
   base having a top portion which is larger in diameter than a diameter of said base, said top portion having a flat upper surface,
   wherein said base is disposed in said coupling hole such that said base and said seating portion form an integral structure, said top portion of said base forms a jaw which overhangs said seating portion.

9. The case structure for housing the fishing hook according to claim 8, further comprising a pressing part formed on the surface of the cover corresponding to the projection, the pressing part having a hole into which the projection is pressed.

10. The case structure for housing the fishing hook according to claim 8, wherein the case body is in a form of a fish.

11. The case structure for housing the fishing hook according to claim 8, wherein the case body has a locking part formed at one side thereof for locking the cover to the case body.

12. The case structure for housing the fishing hook according to claim 8, wherein the case body is coated with one of a luminous material and a fluorescent material.

* * * * *